Feb. 23, 1932.  C. G. WILDERSON  1,846,295
WOODWORKING MACHINERY
Filed May 17, 1928  5 Sheets-Sheet 1

INVENTOR
Clinton G. Wilderson
by his attorneys
Byrnes, Stebbins & Parmelee

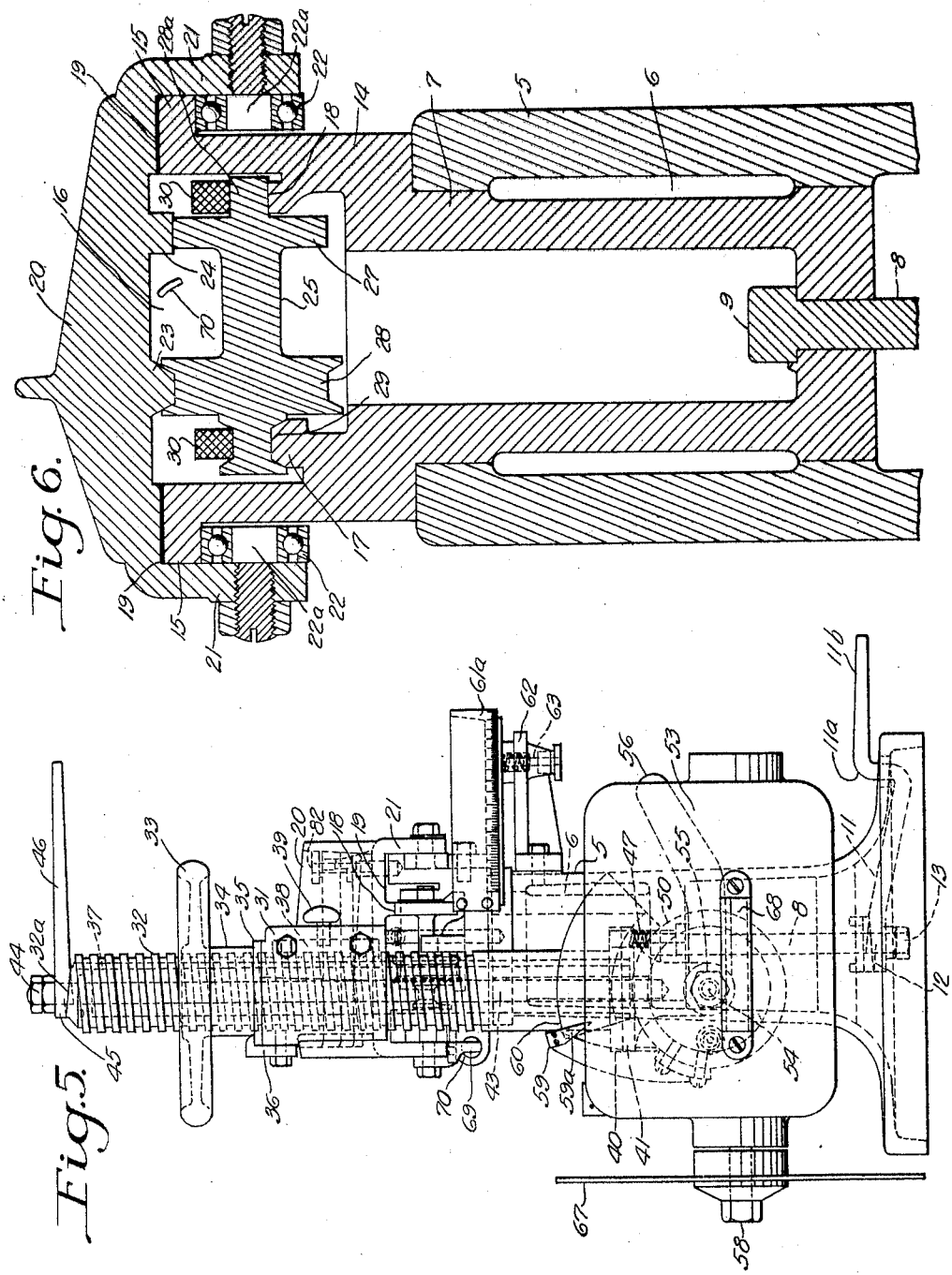

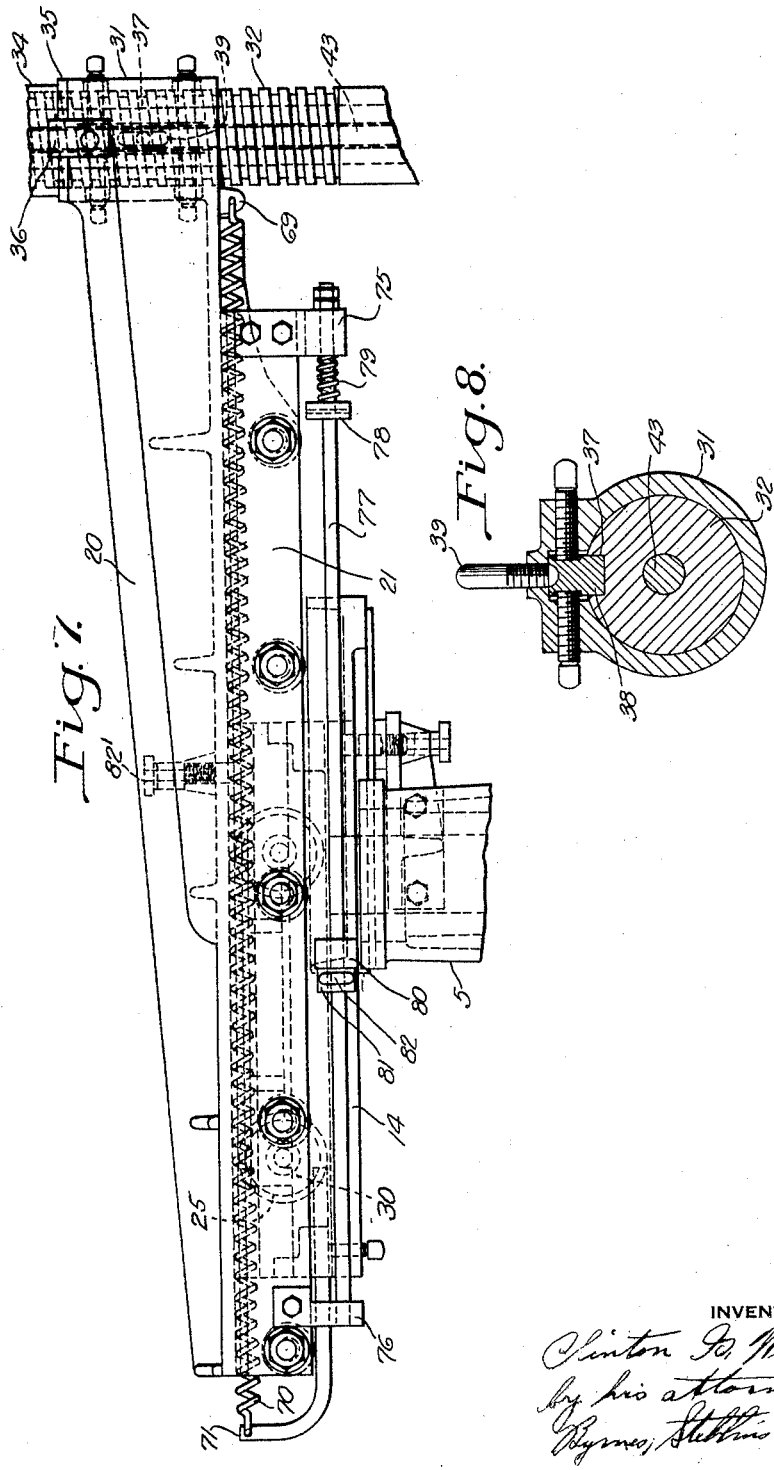

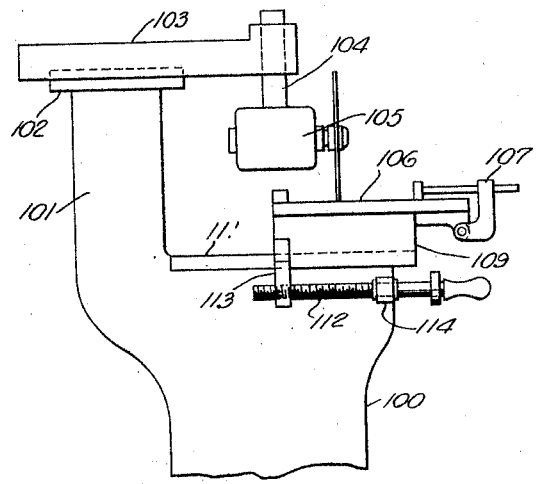
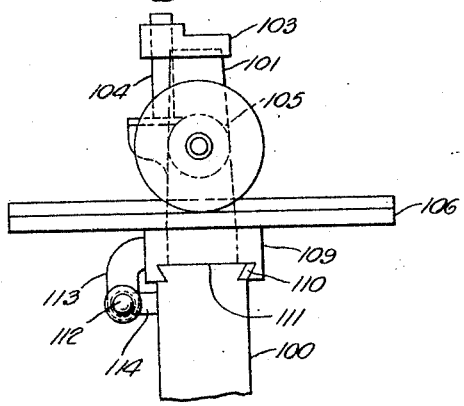

Patented Feb. 23, 1932

1,846,295

UNITED STATES PATENT OFFICE

CLINTON G. WILDERSON, OF LEETONIA, OHIO

WOODWORKING MACHINERY

Application filed May 17, 1928. Serial No. 278,549.

This invention relates to the art of woodworking, and especially to wood sawing, both ripping and cross-cutting, but is also applicable to other types of work. The invention relates particularly to a machine of more or less light construction intended for doing light work, and especially adapted for use by contractor where a light portable saw is required in the erection of a building or other construction. Obviously, however, the machine is adapted to a great variety of uses.

According to the invention there is provided a saw of the type wherein the saw, or other wood-working tool, is driven from a motor suspended above a work table, the saw being adjustable to different angles in both horizontal and vertical directions and being adjustable vertically, the suspension for the motor being such that the saw can be reciprocated back and forth across the table at a desired angle. By reason of the various adjustments the ends of rafters and joists in a building construction can be cut at the proper angle. The invention provides a saw of this type of superior construction which may be operated and adjusted with greater ease and facility than saws of this type heretofore constructed and wherein the wood may be accurately sawed at any angle that may be necessary.

The invention may be readily understood by reference to the accompanying drawings, in which Figure 1 is a side elevation of a wood-working machine embodying the present invention;

Figure 5 is a front elevation of the unit shown in Figure 1;

Figure 6 is a transverse vertical section of a larger scale through the swivel post and track, the section being substantially in the plane of line VI—VI of Figure 1;

Figure 7 is a side elevation of the carriage and a portion of its mounting showing an adjustable stop arrangement therefor;

Figure 8 is a transverse horizontal section in the plane of line VIII—VIII of Figure 1;

Figure 9 is a somewhat diagrammatic side elevation of a modified unit wherein the saw table is adjustable; and Figure 10 is a front elevation of the arrangement shown in Figure 9.

Figure 1:
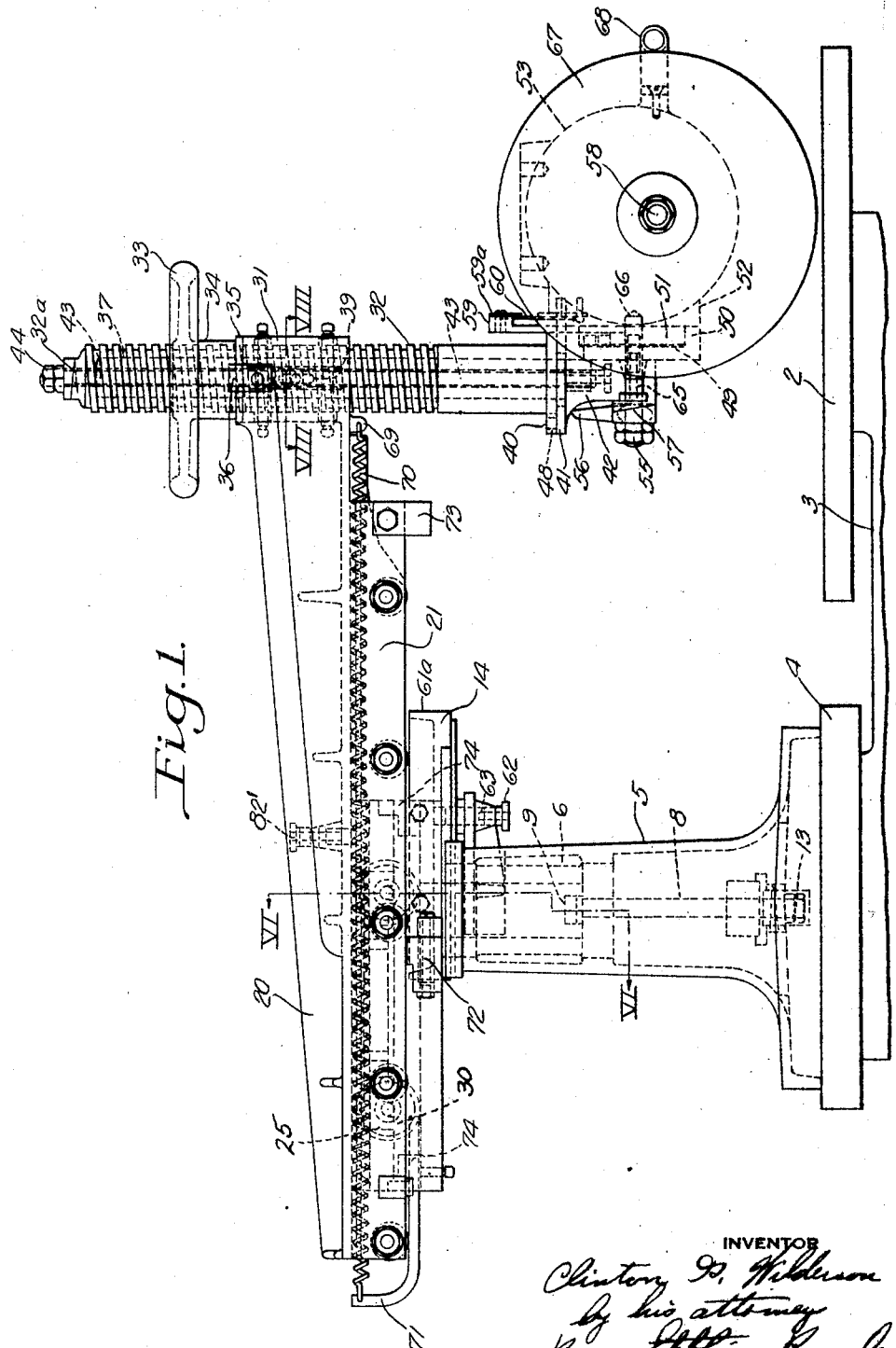

In the drawings, 2 designates a saw table on a framework 3. On a platform 4 at the rear of the framework 3 is a pedestal 5 having a socket 6 in the top thereof in which is set a post 7, the construction of which is best shown in Figure 6. Passing through the bottom of the post 7 and extending down through the pedestal 5 is a rod 8 with a head 9 that bears against the bottom of the inside of the post, as shown in Figure 6.

Figure 4:
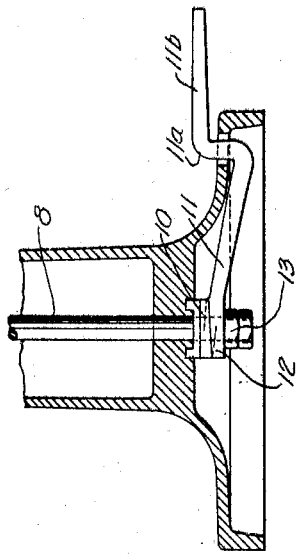
Figure 4 is a detail view of the friction clamp for holding the arm or trackway of the saw in the position to which it is adjusted.

In the lower part of the pedestal is an inclined cam member 10 through which the lower end of the rod 8 passes. On the lower end of the rod 8 is a lever 11 with a central portion 12 having an inclined surface for cooperation with the member 10. The lever 11 is retained in position by nuts 13. The lever 11, best shown in Figure 4, has an offset portion 11$^a$ projecting through a slot in the base of the pedestal and terminating in a handle 11$^b$. The arrangement is such that by swinging the lever 11 the portion 12 rotates with respect to the cam member 10 pulling down or releasing the rod 8 as the case may be. By pulling down on the rod 8 the post 7 is frictionally held against rotation in the socket 6. By releasing the rod 8, the post is made free to rotate. Carried on the top of the post 7, and preferably cast integral therewith is a cross head 14. The cross head 14 has laterally extending flanges 15 at each side thereof and has a central channel 16. At each side of the channel 16 is a track. One of the tracks is designated 17 and the other 18. At the top of each side of the channel is a flat surface 19.

Set over the cross head 14 and normally completely enclosing the same is a reciprocable ram or carriage 20 which is preferably in the form of a relatively heavy casting. Depending from each side of the ram 20 are flanges 21 in which are carried anti-friction rollers 22. The anti-friction rollers 22 ride against the under side of the flanges 15, and permit the carriage or ram 20 to slide back and forth while restraining the carriage from lifting off the cross head 14.

On the under surface of the member 20 are two rails 23 and 24. The carriage 20 is supported on spaced apart rollers 25. The construction of the roller member 25 is best shown in Figure 6. Each of the roller members has a wheel portion 27 adapted to co-operate with the rail 24, another wheel portion 28 having a channeled periphery adapted to cooperate with the rail 23, and at one end of the roller structure is an extension 28$^a$ adapted to ride on the rail or track 18. At the other end of the roller member 25 is an extension 29 having a channeled periphery cooperating with the rail 17. The rollers 25 are held in spaced relation by means of spacing bars 30 as shown in Figures 1 and 7. The two rollers 25 form a substantially anti-friction or low friction mounting for the member 20. When the member 20 is pushed or pulled, as hereinafter more fully described, it will roll on the roller wheel portions 27 and 28 of the two rollers 25. The extensions 28$^a$ and 29 roll on the rails 18 and 17 respectively. Due to the fact that the diameter of the extensions 28$^a$ and 29 is considerably less than the diameter of the wheel portions 27 and 28, the roller members 25 travel only a relatively short distance while the member 20 moves through its full limit of travel, as hereinafter more fully explained. For this reason the cross head 14 need only be about half as long as the carriage or slide 20, and yet the ram or carriage 20 will have a steady, well guided, balanced and low friction mounting on the post 7. By reason of the downwardly turned flanges 21 and the manner in which the ram substantially covers over the cross head 14, the rollers 25 and the trackways on which they run are not exposed to the accumulation of sawdust and dirt.

Carried on the forward end of the ram or cross sliding arm 20 is a sleeve portion 31 through which passes a threaded post 32. On the threaded post 32 is a hand wheel 33 having a threaded hub portion 34 and a flanged end 35. Cooperating with the flange 35 is a keeper 36 for holding the hand wheel down against the top of the sleeve 31. By turning the wheel 33 the post 32 can be raised and lowered. Extending down one side of the post 32 is a groove 37. Within the sleeve 31 is a key 38 adapted to hold the post 32 from turning. A thumb screw 39 connected with the key 38 provides an operating means for this key. By screwing up on the bolt 39 the key 38 can be forced into clamping engagement with the groove 37 to frictionally hold the post 32 against vertical movement. This prevents the post from working up and down under vibration.

At the bottom of the post 32 is a face plate 40. Bearing against the face plate 40 is a flat plate 41 on a casting 42. The casting 42 has a rod 43 thereon which extends up through the threaded post 32 and projects through the top of the threaded post. On the top of the post 32 is an inclined surface 32$^a$. On the top of the rod 43 are nuts 44. Confined between the nuts 44 and the inclined surface 32$^a$ is the inner end portion 45 of a lever 46. The portion 45 is inclined for co-operation with the inclined surface 32$^a$, as most clearly shown in Figure 5. By turning the lever 46 in one direction the incline 32$^a$ forces the lever up, thereby pulling up on the rod 43 to hold the flat face 41 of the casting 42 tightly against the face plate 40 at the bottom of the post 32. By rotating the lever 46 in the opposite direction the rod 43 is dropped slightly to permit the casting 42 to swing about the bottom of the post 32 in a horizontal plane.

Carried on the casting 42 is a snap pin 47. In the face plate 40 at certain positions are holes 48. When the casting 42 is set at certain angles the spring actuated snap pin 47 will enter one of the holes 48 to hold the casting 42 against rotation independently of the friction arrangement just described. The snap pin 47 is preferably used only for locating the casting 42 in the more important operating positions, as when the saw, hereinafter to be described, is parallel with the arm 20, or is at a 45° or 90° angle thereto.

On the casting 42 there is a vertical face 49 surrounded by a flange 50. Set into the recess thus formed is a projection 51 on a casting 52 that carries a motor 53. On the casting 52 is a central post 54 that projects through the casting 42, see Figure 3, and which is provided with nuts 55 at the outer end thereof. On the post or rod 54 is a lever 56 similar to the lever 46 having an inclined surface for cooperation with an inclined surface 57 on the casting 42. When the lever 56 is operated in one direction the casting 51 is drawn into tight frictional contact with the surface 49 and the motor held against turning on a horizontal axis passing through the rod 54. When the lever 56 is loosened the motor 53 may be rotated about the axis of the post 54.

Figure 3:
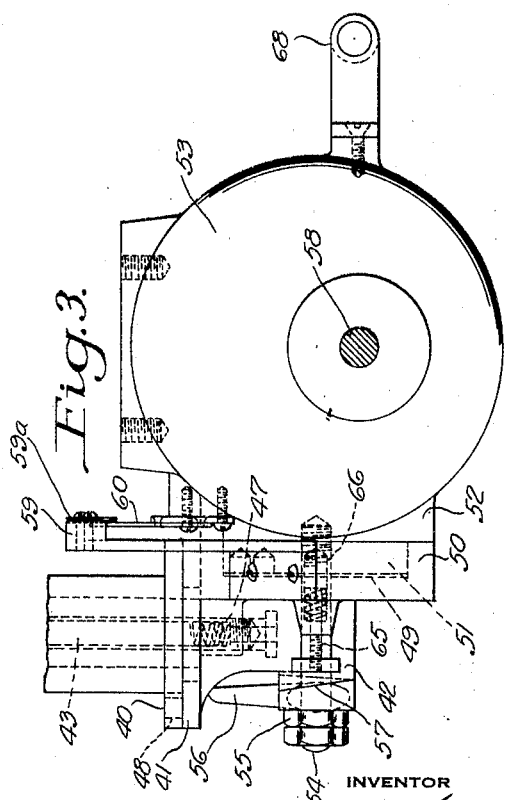
Figure 3 is a detail view of the motor and motor mounting, the shaft of the motor being shown in section.

In Figure 3 the shaft 58 of the motor is in a horizontal position, but the motor can be rotated through an arc of 90° until the shaft 58 turns vertically downward. By operation of the lever 56 the motor can be locked at any angle intermediate these two positions. Supported on the casting 42 is a segment 60 which carries a scale. An arm 59 on the casting 52 has a pointer 59$^a$ cooperating with the scale to indicate the degree at which the shaft of the motor 53 is tilted. The edges of the parts 40 and 41 may be calibrated to show the angle at which the casting 42 is rotated with reference to the post 32.

Supported at one side of the ram or reciprocating arm 20 and projecting laterally therefrom is a segment 61. Projecting from the side of the pedestal 5 is a bracket 62 having a pointer 62ª for cooperation with a graduated scale 61ª on the segment 61. The bracket 62 also carries a spring actuated snap pin 63 which can be projected into any one of the three openings 64 in the segment 61 for rigidly locking the cross arm structure against rotation in the pedestal 5. This interlock is provided in addition to the friction clamp arrangement comprising the lever 11 and the associated parts. The holes 64 are preferably placed at 45° intervals, these being the three major operating angles of the arm. The friction clamp can be relied upon in other positions.

On the casting 42 is another snap pin 65 adapted to project into suitably located sockets 66 in the casting 51 for locking the motor 53 at certain angles. At points intermediate these angles the friction clamp including the lever 56 may be relied upon. The snap pins in each case are not necessary, but are provided as an additional holding means for the more important adjustments of the various parts.

Carried on the motor shaft 58 is a suitable wood-working tool 67, such as a disk saw. Obviously, instead of a disk saw, any other suitable wood-working tool might be used, such as a dado head or a routing attachment.

Secured to the motor 53 is a handle 68. Connected to a lug 69 adjacent the sleeve 31 at the forward end of the ram is a spring 70. The spring 70 extends down through the under side of the ram 20 and is attached to a bracket 71, rigidly secured to the rear end of the cross head 14, as best shown in Figure 1.

In the operation of the saw, the material to be cut is laid on the table 2 against a suitable guide, not shown. If the saw is to be used for cross cutting the operator grasps the handle 68 and pulls the saw toward him. The ram or arm 20 rolls evenly and freely on the rollers and track on which it is carried. When the operator releases the handle 68 the spring 70 functions to draw the arm or ram back to its original position. In cross cutting the saw blade may be parallel to the ram 20 or it may be at any suitable angle with respect thereto. Likewise the motor shaft 58 may be in a horizontal plane, as shown in Figure 1, or it may be tilted. By setting the motor at the proper angle, both with respect to the arm 20 and with respect to the horizontal, the wood can be cut on a compound angle or bevel, such as the necessary rafters for roofing and the like. Also, instead of moving at right angles across the saw table 2, the whole arrangement may be swung about the pedestal 5 to a desired angle.

Figure 2:
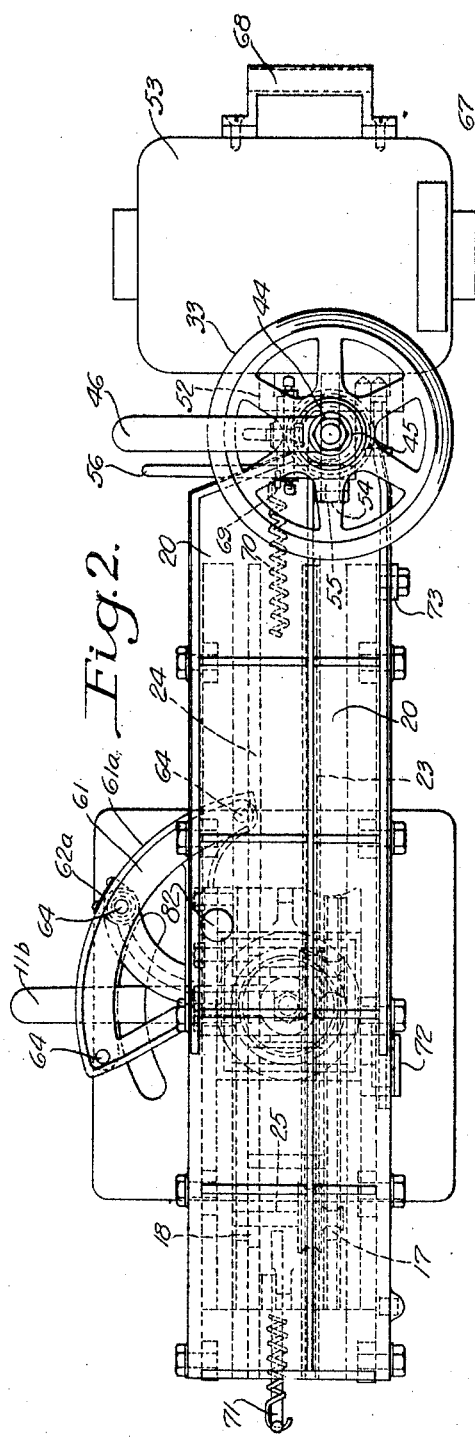
Figure 2 is a top plan view thereof.

In rip sawing the motor is usually rotated about the post 32 to a position at right angles to the position shown in Figures 1 and 2 at which time the saw blade 67 is at right angles to the extensible arm 20 rather than parallel therewith. The saw is set in this position and the board to be ripped is moved longitudinally along the table 2. In rip sawing it is not necessary to pull the saw back and forth over the wood, as in cross cut sawing.

At one side of the crosshead 14 is a buffer 72. A stop member 73 is provided on the ram for cooperation with the buffer. In Figures 1 and 2 the sliding arm or ram 20 is shown in its extended position. In the retracted normal position of the arm the stop member contacts with the buffer 72.

The stops 74 in the channel 16 prevent the ram from being moved too far in either direction. These stops are in the path of travel of the rollers 25.

In Figure 7 I have shown a side elevation of the reciprocable arm or ram and its mounting having a limit stop applied thereto which may be used in cutting off narrow gauge material, or which may be used as a depth gauge when a boring tool instead of a saw blade is mounted on the motor shaft. In this figure the general construction of the reciprocable arm is the same as that previously described.

Supported at one side by the arm or arms 75 and 76 is a rod 77. The rod 77 is slidable in the arms 75 and 76. At 78 is a collar which is fixed on the rod, and a tension spring 79 is confined between the collar and the arm 75. The rod 77 is slidably passed through a lug 80 projecting laterally from the cross head 14. On the rod 77 is an adjustable collar 81 that can be secured in a predetermined point by means of a set screw 82 thereon.

With this construction, the collar 81 is set at a desired point between the lug 80 and the arm 76. When the carriage has been pulled forward a predetermined distance the collar 81 will contact with the lug 80 to limit the further forward travel of the carriage. The spring 79 provides a buffer for absorbing the shock of the return movement of the carriage, so that when the collar 81 contacts with the collar 78 the carriage will be brought to an easy stop.

Mounted on the carriage is a snap pin 82' which may be projected into openings (not shown) along the track member 14, particularly at each limit of movement of the carriage whereby the carriage may be rigidly locked in a given position.

The anti-friction rollers 22 for the carriage are carried on eccentric studs 22ª, see Figure 6. By rotating the studs, wear which develops can be taken up and the ram 20 kept in proper alignment at all times.

The machine as herein described forms a convenient small woodworking unit which is convenient to operate and in which the saw or other tool can be conveniently set at any angle, at which time it may be necessary or desirable to work for performing various operations and doing various special jobs. All the various adjustments can be easily and quickly made. The structure is rugged, the particular construction and mounting of the carriage provides for an accurate, smooth and easy movement thereof.

In the operation of rip sawing, it may be desirable to set the carriage at a given position with the saw at right angles thereto. It is then desirable to adjust the table to gauge the width of the strip being sawed. For this purpose the arrangement shown in Figures 9 and 10 is employed.

In these figures, 100 is the machine frame, 101 the pedestal at the back of the frame, 102 the track member, and 103 the carriage with the adjustable post 104 at the forward end thereof. The post carries the saw and motor arrangement 105 as hereinbefore described. The whole arrangement is generally similar to the construction previously described except that the saw table 106 with its ripping guide 107 is mounted on a casting 109 having a groove 110 in its bottom surface to cooperate with a slide surface 111 on the frame 100.

With this arrangement, the carriage and saw can be set at one of the few points to which it can be set, as previously described, and the table adjusted according to the width of the board being sawed. A screw 112 in a bearing 114 on the frame cooperating with a nut 113 on the casting serves to operate the table.

While I have described a preferred embodiment of the invention in detail, it will be understood that various changes and modifications may be made therein within the contemplation of my invention and under the scope of the following claims.

I claim:

1. In a wood-working machine, a pedestal, a post rotatably set in the pedestal, a trackway at the top of the post, a carriage mounted for movement along the trackway, said carriage partially enclosing the trackway, an adjustable post at the front end of the carriage, a motor mounted at the lower end of said post and adjustable on horizontal and vertical axes with respect thereto, said motor having a shaft, and a wood-working tool driven by the shaft.

2. In a wood-working machine, a pedestal, a post rotatably set in the top of the pedestal, means for yieldably clamping the post against rotation, a track member on the post, a carriage reciprocable along the trackway, a post at one end of the carriage, means for adjusting the post vertically with respect to the carriage, a bracket swiveled to the lower end of the post, means for releasably holding the bracket against rotation, a motor supported on said bracket so as to be capable of rotation about a horizontal axis, means for releasably clamping the motor in the position to which it is rotated, and a wood-working tool driven by the motor.

3. In a wood-working machine, a pedestal, a trackway at the top of the pedestal having laterally disposed flanges thereon, a carriage of greater length than the trackway fitted thereover and having depending flanges thereon, rollers on said depending flanges engaging under the flanges of the trackway, rails on the carriage, rails on the trackway between said flanges, and rollers operatively interposed between the carriage and the trackway.

4. The combination with a post rotatably mounted in a pedestal, of a trackway having rails and flanges integral therewith, and a carriage for cooperation with said trackway, rails and flanges thereon, a plurality of free-running rollers between the rails of said carriage and trackway, and a plurality of rollers secured to the carriage flanges for engaging the trackway flanges.

5. The combination, in a woodworking machine, with a pedestal, a post rotatably supported within said pedestal, a horizontal trackway integral with said post, of a carriage for cooperation with said trackway, a sleeve at one end of said carriage, a tool support therein, means for adjusting said support vertically with respect to said sleeve, a bracket secured to said support for rotation thereabout, and a motor-supporting block secured to said bracket for rotation about a horizontal axis.

6. The combination with relatively fixed trackway and a carriage movable longitudinally thereof, arms projecting from said movable carriage and a lug projecting from said trackway, coaxial holes in said arms and lug, a rod passing through said holes and yieldably secured to one of said arms, collars on said rod for engaging said lug in the extreme positions of said carriage and a spring connecting the carriage and trackway whereby, after movement in either direction, said carriage is gradually decelerated at the limit of its movement.

7. In an adjustable tool support, a relatively fixed sleeve, a threaded post within said sleeve, a nut for moving the post with respect to the sleeve, a rod traversing said post and a tool-supporting member swiveled thereon below said post, a cam surface at the upper end of the post and a cam collar on said rod, and means for turning said collar with respect to said surface whereby to clamp the tool-supporting member rigidly to said post.

In testimony whereof I have hereunto set my hand.

CLINTON G. WILDERSON